US012433819B1

(12) United States Patent
Leng

(10) Patent No.: US 12,433,819 B1
(45) Date of Patent: Oct. 7, 2025

(54) DUAL-DRIVE UNIVERSAL SEXUAL PRODUCT WITH MULTI-POINT STIMULATION

(71) Applicant: Dongguan Guigong Adult Supplies. Co., Ltd., Dongguan (CN)

(72) Inventor: Xingchen Leng, Dongguan (CN)

(73) Assignee: Dongguan Guigong Adult Supplies. Co., Ltd., Guangdong (CN)

( * ) Notice: Subject to any disclaimer, the term of this patent is extended or adjusted under 35 U.S.C. 154(b) by 0 days.

(21) Appl. No.: 19/034,761

(22) Filed: Jan. 23, 2025

(30) Foreign Application Priority Data

Dec. 23, 2024 (CN) ......................... 202423189919.8

(51) Int. Cl.
*A61H 19/00* (2006.01)
*A61H 21/00* (2006.01)
*A61H 23/02* (2006.01)

(52) U.S. Cl.
CPC ............. *A61H 19/44* (2013.01); *A61H 21/00* (2013.01); *A61H 23/0254* (2013.01); *A61H 2201/0165* (2013.01); *A61H 2201/0192* (2013.01); *A61H 2201/1215* (2013.01); *A61H 2201/1454* (2013.01); *A61H 2201/1669* (2013.01); *A61H 2201/1676* (2013.01); *A61H 2205/087* (2013.01)

(58) Field of Classification Search
CPC ........ A61H 19/00; A61H 19/30; A61H 19/40; A61H 19/44; A61H 19/50; A61H 21/00; A61H 23/0254
See application file for complete search history.

(56) References Cited

U.S. PATENT DOCUMENTS

| | | | | |
|---|---|---|---|---|
| 11,806,306 | B1 * | 11/2023 | Guo | A61H 7/007 |
| 12,011,409 | B1 * | 6/2024 | Wang | A61H 19/40 |
| 12,161,598 | B1 * | 12/2024 | Wang | A61H 23/0263 |
| 2024/0307261 | A1 | 9/2024 | Wang et al. | |
| 2024/0325240 | A1 * | 10/2024 | Zhang | A61H 23/0254 |

* cited by examiner

*Primary Examiner* — Carrie R Dorna
(74) *Attorney, Agent, or Firm* — Rondaus PLLC; George Liu

(57) ABSTRACT

Disclosed is a dual-drive universal sexual product with multi-point stimulation, including a base, a driving base, a telescopic base, and a driving device. The base is fixedly arranged in a housing, the base is provided with at least one claw arm distributed circumferentially along an axis of the base, and the base is provided with a pivoting portion. The claw arm is swingingly mounted on the pivoting portion, the claw arm is provided with a driving arm in a way of extending from the pivoting portion in an axis direction, and the driving arm is provided with an elongated driving groove. The driving base is arranged on a lower wall of the base and can slide in a height direction, and the driving base and the driving arm are connected directly or through a transmission member. The driving base extends upward to form the telescopic base.

20 Claims, 20 Drawing Sheets

DUAL-DRIVE UNIVERSAL SEXUAL PRODUCT WITH MULTI-POINT STIMULATION

TECHNICAL FIELD

The present disclosure relates to the technical field of sexual products, and in particular to a dual-drive universal sexual product with multi-point stimulation.

BACKGROUND

Adult products of the prior art generally only have single functions of stimulation through vibration, telescoping and the like. Therefore, to achieve multiple stimulations with a sexual product, a plurality of driving devices are usually used for driving separately in the prior art, which achieves availability of different stimulation sources.

Moreover, sexual product driving structures of the prior art are mainly applied to male or female adult products, and are relatively limited in applications, with higher mold costs in actual production.

SUMMARY

A main objective of the present disclosure is to provide a dual-drive universal sexual product with multi-point stimulation, with an aim to improve a sexual product structure of the prior art and achieve availability of dual stimulation sources, where the sexual product structure is partially universal and is applied to male adult products or female adult products, thereby effectively reducing production costs.

To achieve the above objective, the present disclosure provides a dual-drive universal sexual product with multi-point stimulation. The sexual product includes:

- a base, where the base is fixed to a structure such as a housing, the base is provided with at least one claw arm distributed circumferentially along an axis of the base, the base is provided with a pivoting portion, the claw arm is swingingly mounted on the pivoting portion, the claw arm is provided with a driving arm in a way of extending from the pivoting portion in an axis direction, and the driving arm is provided with an elongated driving groove;
- a driving base, where the driving base is arranged on a lower wall of the base and can slide in a height direction, the driving base is provided with a movable shaft that is distributed like the claw arm, and the movable shaft extends into the driving groove and can slide in a length direction thereof;
- a driving device, where the driving device is arranged on a lower wall of the driving base and is configured to drive the driving base to move reciprocatingly in a vertical direction, and when the driving base moves, a front end of the claw arm is driven to swing reciprocatingly around the pivoting portion as a fulcrum.

In an actual design, the base is fixedly arranged in the housing, the claw arm and the driving arm are pivotally mounted on the pivoting portion through a rotating shaft, the driving arm extends in an axis direction of the base, and the driving arm is located in a middle of the base; the driving arm can extend downward or upward to achieve connection with the driving base; and in a preferred example, the base is provided with a through hole for the driving base to extend through, which facilitates driving of the driving arm to swing up and down through the movable shaft of the driving base, such that the front end of the claw arm is further driven to swing.

Cooperation of the elongated driving groove and the movable shaft, and a reciprocating stroke of the driving base, enable to drive the movable shaft to slide along the driving groove, which achieves reciprocating swing of the front end of the claw arm. Moreover, the driving base drives the telescopic base to move reciprocatingly, and the telescopic base moves while conversion of a vertical stroke into a swinging stroke is achieved. Despite a simple structure, the present disclosure achieves simultaneous swing of a plurality of arms in a more stable and linear manner.

That is, the claw arm (reciprocating swing) and the telescopic base (reciprocating movement in the vertical direction) move simultaneously, thereby achieving dual stimulation.

A single driving device drives movement of dual stimulation sources without mutual interference. Further, an overall length can be shortened, and production costs are effectively lowered due to reduction of one driving motor.

In actual use, two stimulation sources (i.e., the claw arm and the telescopic base) achieve better synchronization, and have a better effect of stimulation to sexual organs.

When the present disclosure is used as a male adult product, the telescopic base and the claw arm can stimulate an end portion and periphery of a glans, and when the claw arm is longer, a penis can also be stimulated, thereby enhancing the dual stimulation.

Of course, this structure can also be used for anal stimulation.

Since the claw arm fits an outer wall of the housing, when the present disclosure used as a female adult product is inserted into a vagina as needed, the claw arm and the telescopic base achieve vibration and telescoping simultaneously, which achieves stimulation of the vagina through vibration and telescoping respectively, and effectively enhances synchronization of the stimulation.

The sexual product can be a universal sexual product, but differences in use for males and females lie in a length of the telescopic base, and a fitting structure.

Further, when the sexual product with the driving device works, low noise is generated.

REFERENCE NUMERALS IN THE FIGURES

Figure 1:
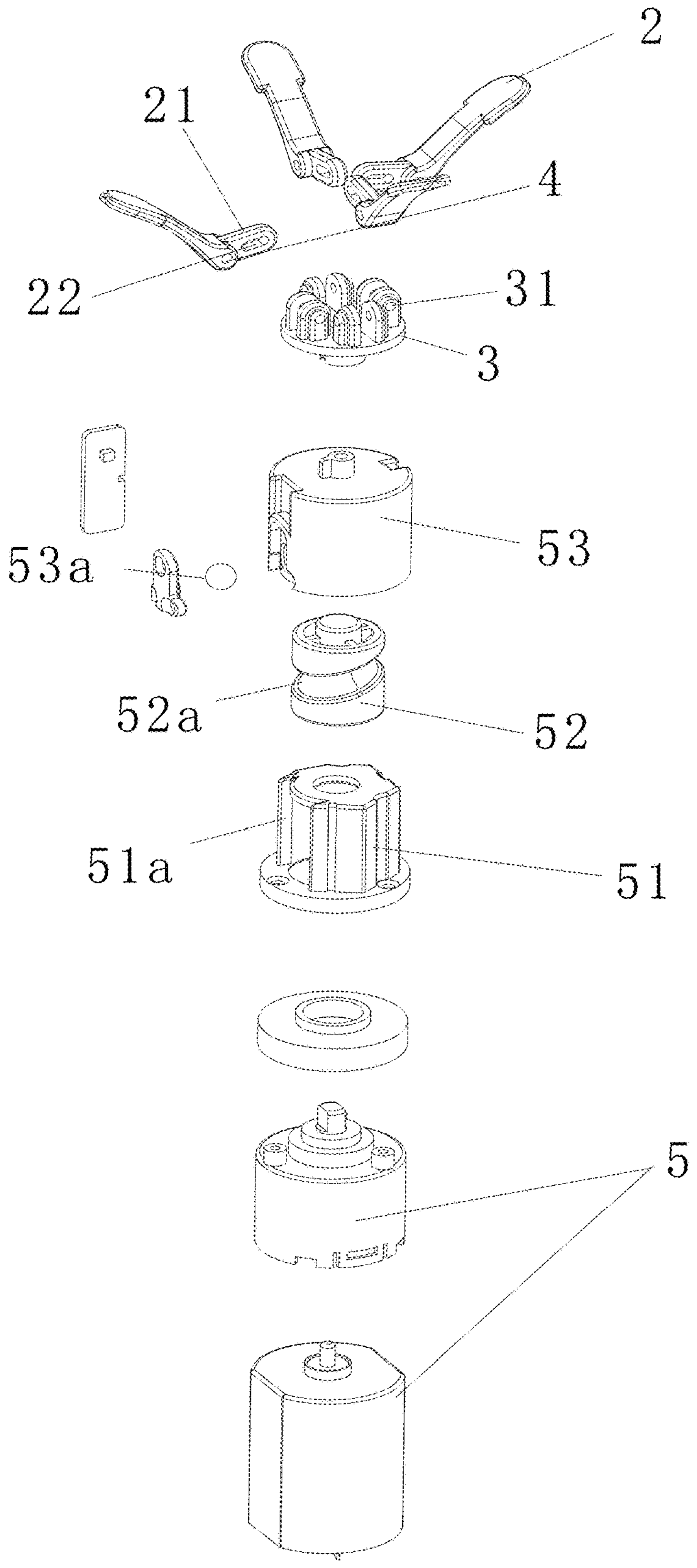
FIG. 1 is an exploded view of the present disclosure without a telescopic base.
Figure 2:
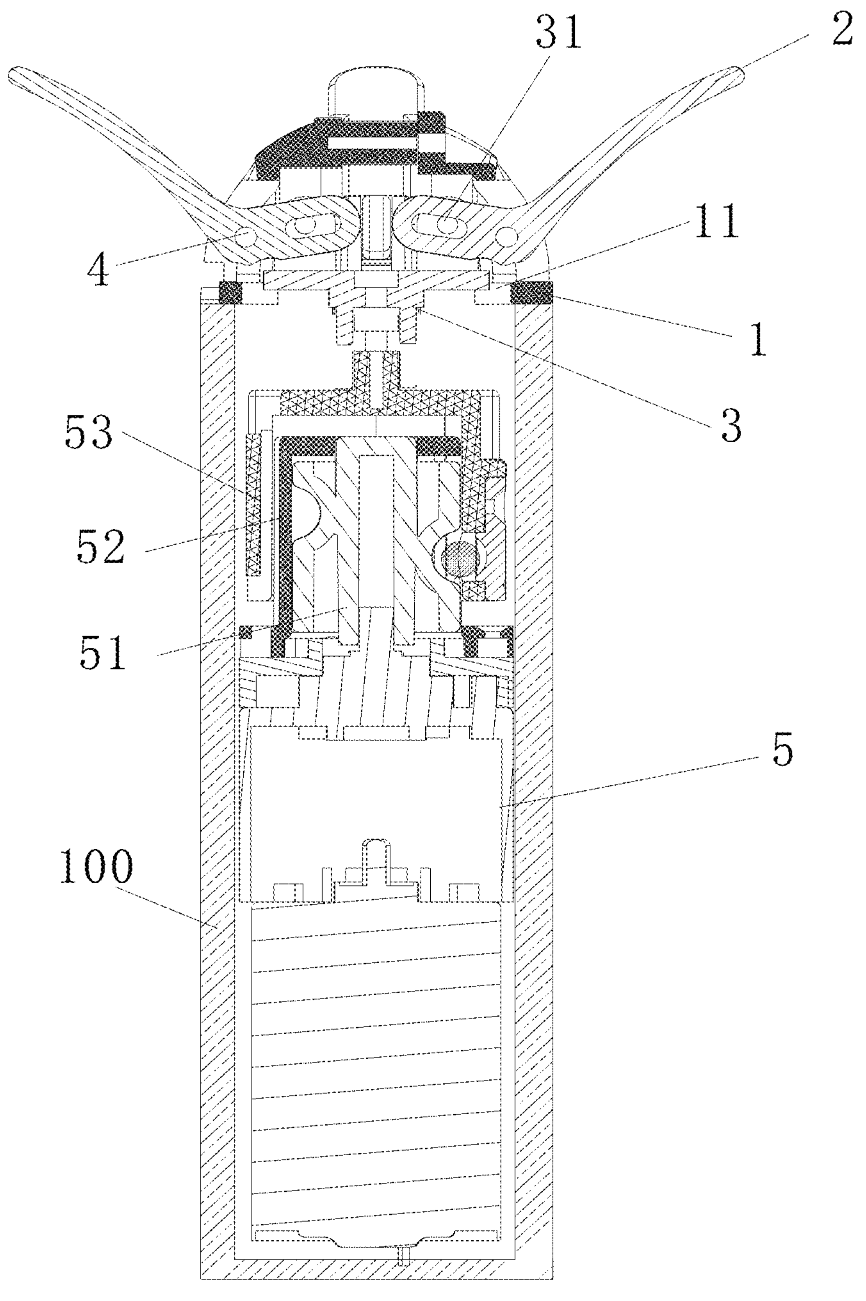
FIG. 2 is a sectional view of the present disclosure without a telescopic base.
Figure 3:
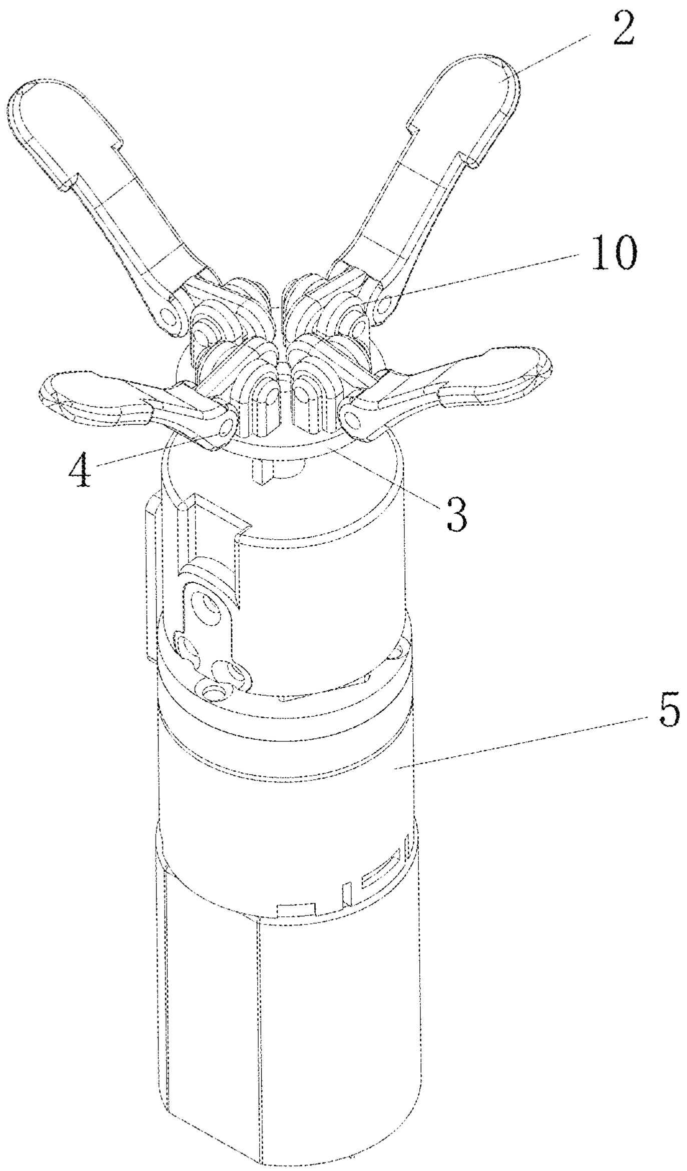
FIG. 3 is a three-dimensional schematic diagram I of the present disclosure without a telescopic base.
Figure 4:
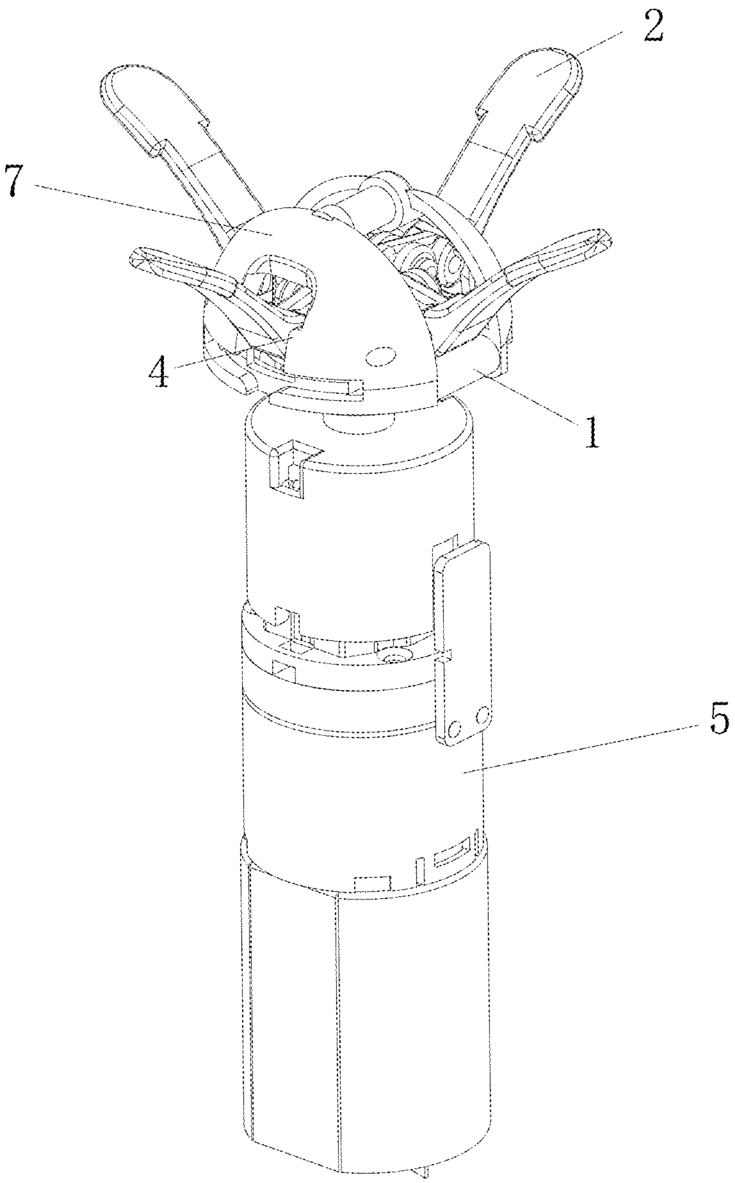
FIG. 4 is a three-dimensional schematic diagram II of the present disclosure without a telescopic base.
Figure 5:
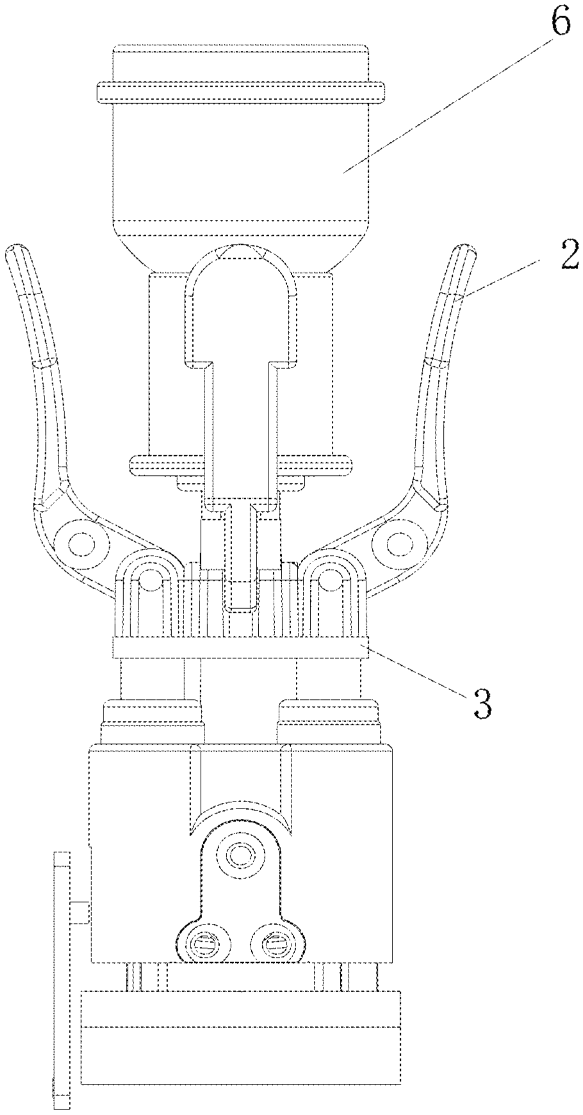
FIG. 5 is a schematic diagram of a planar structure of the present disclosure.
Figure 6:
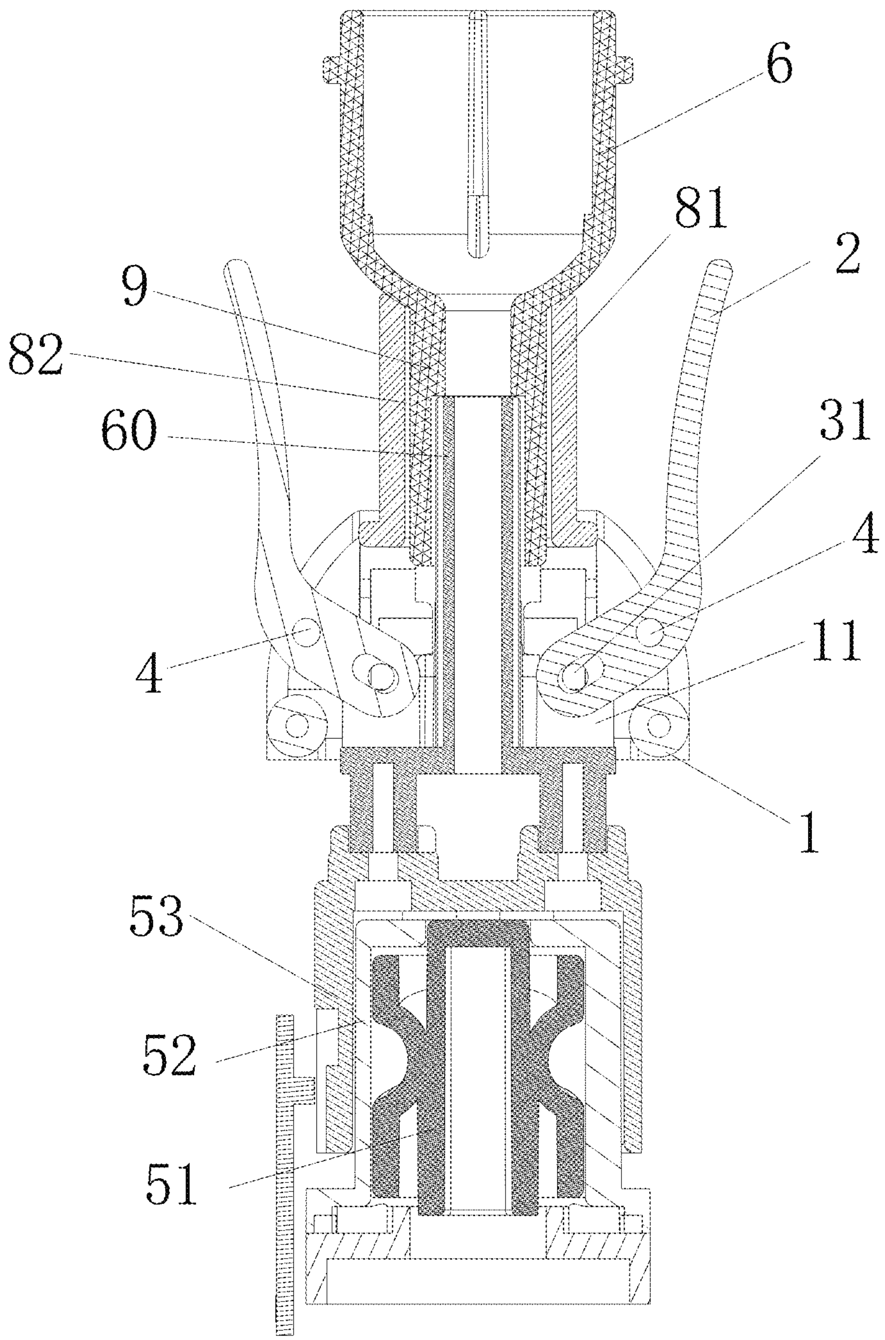
FIG. 6 is a sectional view of the present disclosure.
Figure 7:
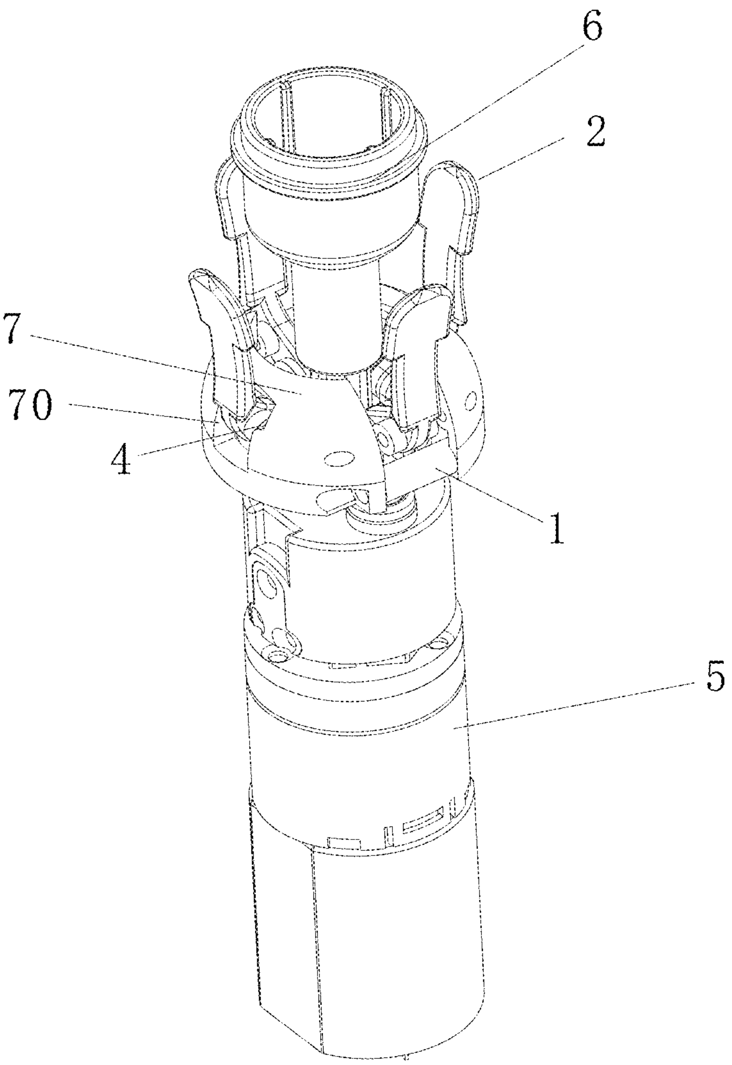
FIG. 7 is a three-dimensional schematic diagram of the present disclosure.
Figure 8:
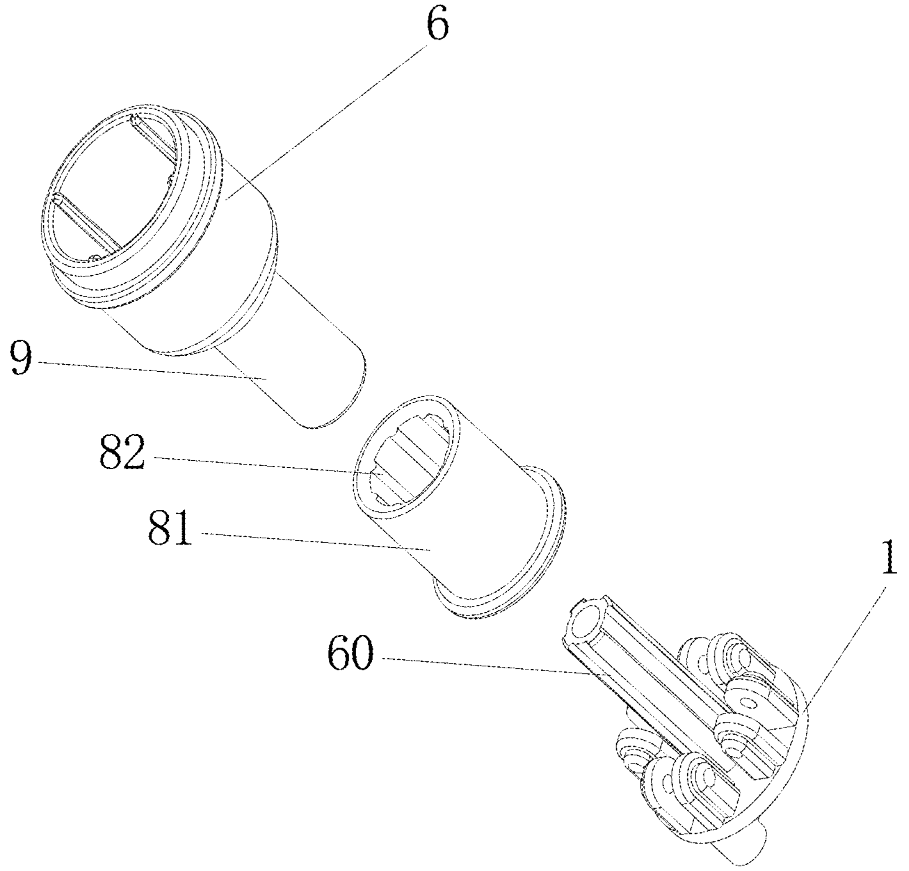
FIG. 8 is a schematic diagram of fitting of a telescopic base and a sliding base.
Figure 9:
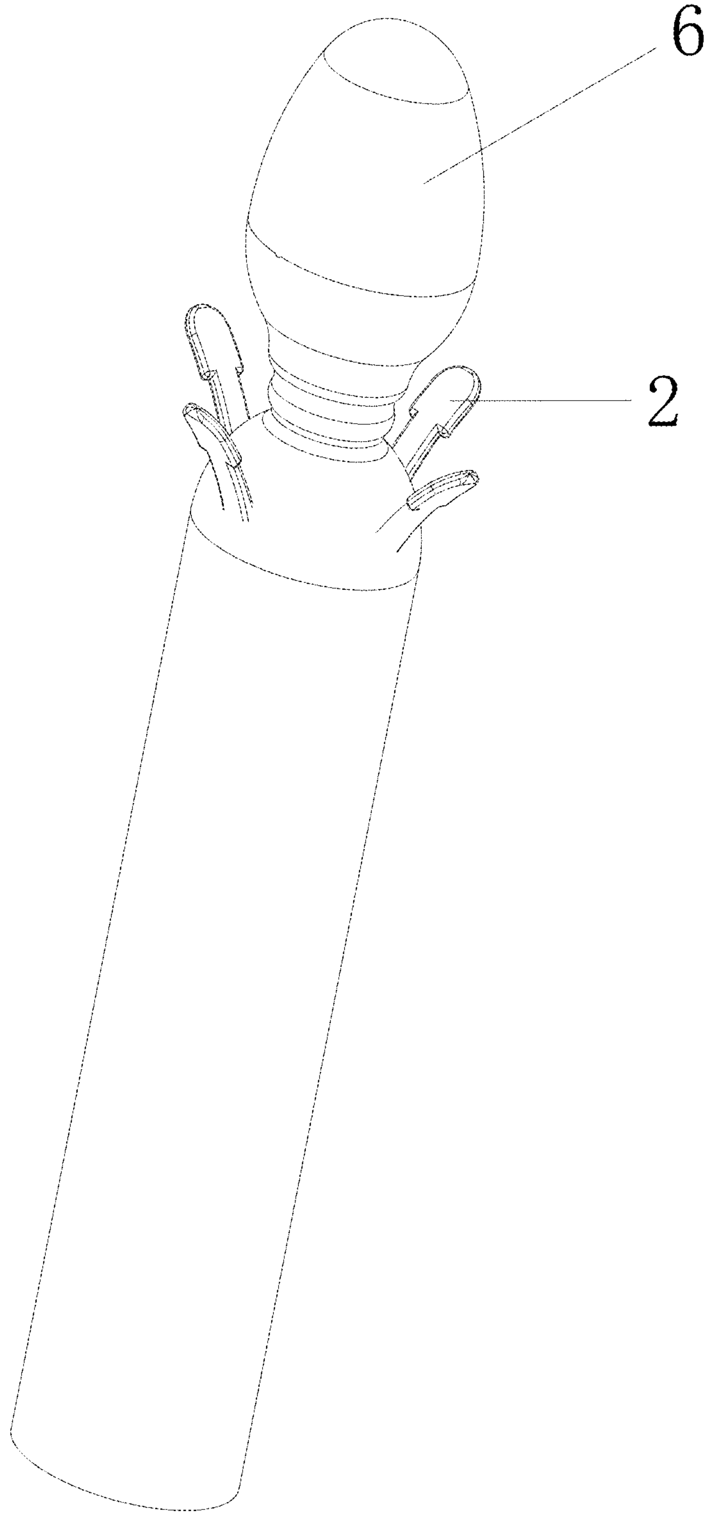
FIG. 9 is a three-dimensional schematic diagram of the present disclosure with a housing and an elastic layer.
Figure 10:
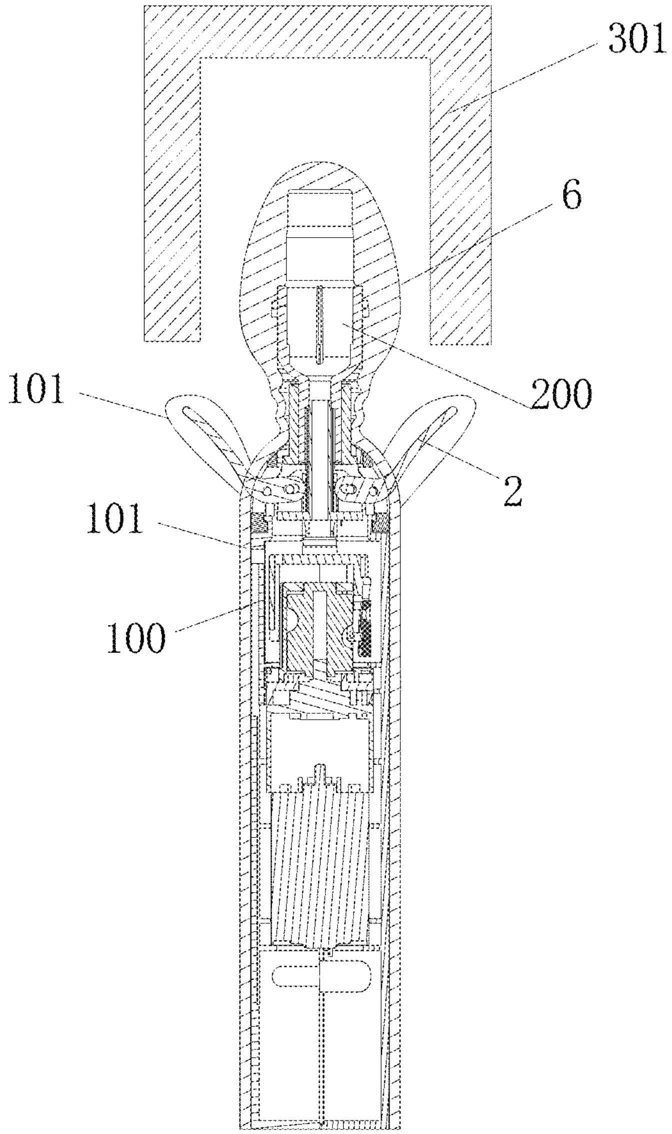
FIG. 10 is a sectional view of the present disclosure as a female adult product.
Figure 11:
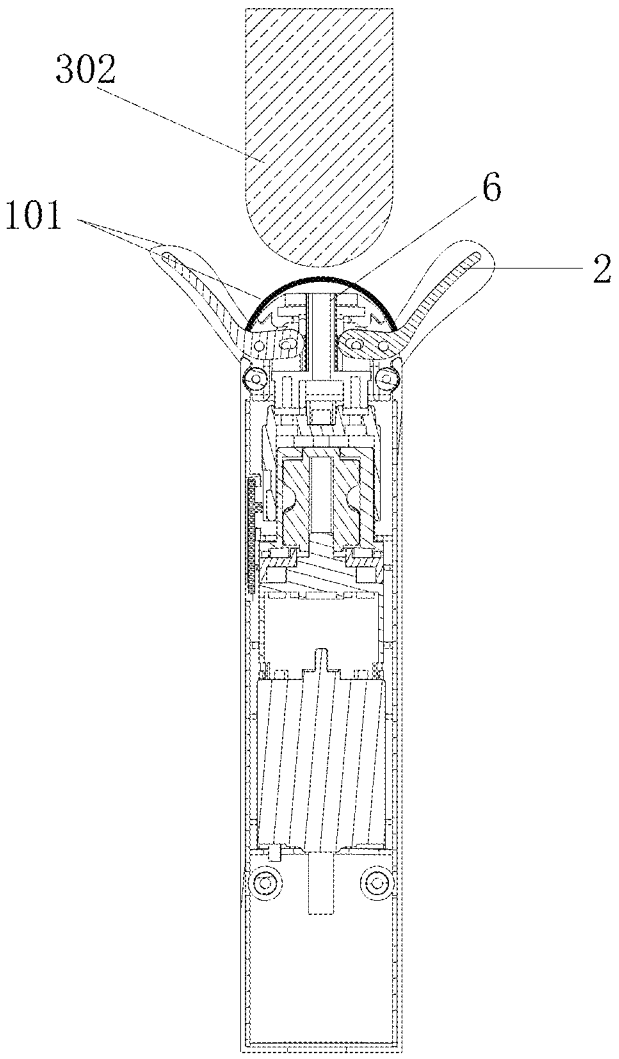
FIG. 11 is a sectional view of the present disclosure as a male adult product.
Figure 12:
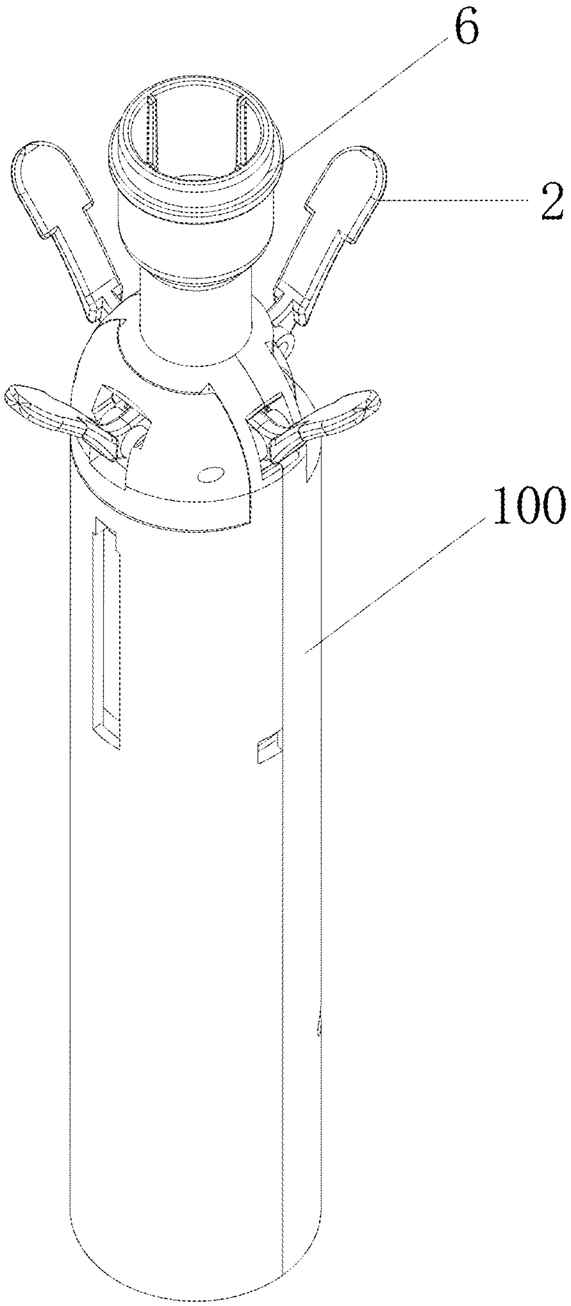
FIG. 12 is a schematic diagram of the present disclosure with an elastic layer hidden.

1. base, 10. pivoting portion, 11. through hole,
2. claw arm, 21. driving arm, 22. driving groove,
3. driving base, 31. movable shaft,
4. rotating shaft,
5. rotary motor, 51. rotating base, 51*a*. arc-shaped groove, 52. guide base, 52*a*. guide groove, 53. sliding base, 53*a*. roll ball,
6. telescopic base, 60. central shaft,
7. upper cover, 70. avoidance hole,
81. guiding sleeve, 82. vertical hole,
9. positioning portion,
100. housing, 101. elastic layer,
200. vibration motor,
301. vagina or anus, and 302. glans.

DETAILED DESCRIPTIONS OF THE EMBODIMENTS

The technical solutions in the examples of the present disclosure will be clearly and completely described with reference to accompanying drawings. Apparently, the examples described are merely some rather than all of the examples of the present disclosure. Based on the examples of the present disclosure, all other examples obtained by those of ordinary skill in the art without making creative efforts shall fall within the protection scope of the present disclosure.

It should be noted that directional indications such as "upper", "lower", "left", "right", "front", "rear", "top", "bottom", "inside", "outside", "vertical", "transverse", "longitudinal", "counterclockwise", "clockwise", "circumferential", "radial", "axial" and the like in the examples of the present disclosure are only for explaining the relative positional relationship, motion state and the like of each component at a specific posture as shown in the accompanying drawings, and when the specific posture changes, the directional indication will also accordingly change.

In the description of the examples of the present disclosure, the terms such as "first" or "second" are for descriptive purposes only and are not to be construed as indicating or implying their relative importance or implicitly specifying the number of indicated technical features. Thus, a feature defined with "first" and "second" may explicitly or implicitly include at least one of the features. Further, the technical solutions between various examples of the present disclosure may be combined with one another on the basis that they may be implemented by those of ordinary skill in the art. When leading to contradiction or failing in implementation, the combination between the technical solutions should be deemed non-existent, and falls outside the scope of protection of the present disclosure.

As illustrated in FIGS. 1-12, a dual-drive universal sexual product with multi-point stimulation includes:

a base 1 (the base 1 is fixed to a structure such as a housing 100), where the base 1 is provided with at least one claw arm 2 distributed circumferentially along an axis of the base 1, the base 1 is provided with a pivoting portion 10, the claw arm 2 is swingingly mounted on the pivoting portion 10, the claw arm 2 is provided with a driving arm 21 in a way of extending from the pivoting portion 10 in an axis direction, and the driving arm 21 is provided with an elongated driving groove 22;

a driving base 3, where the driving base 3 is fixedly arranged in the housing 100, the driving base 3 is arranged on a lower wall of the base 1 and can slide in a height direction, and the driving base 3 and the driving arm 21 are connected directly or through a transmission member;

for example, the driving base 3 is provided with a movable shaft 31 that is distributed like the claw arm 2, and the movable shaft 31 extends into the driving groove 22 and can slide in a length direction thereof;

of course, the driving base 3 can also be indirectly connected to the driving groove 22 through a connecting rod, so as to achieve swing thereof; and a driving device, where the driving device is arranged on a lower wall of the driving base 3 and is configured to drive the driving base 3 to move reciprocatingly in a vertical direction, and when the driving base 3 moves, a front end of the claw arm 2 is driven to swing reciprocatingly around the pivoting portion 10 as a fulcrum.

In an actual design, the base 1 is fixedly arranged in the housing 100, the claw arm 2 and the driving arm 21 are pivotally mounted on the pivoting portion 10 through a rotating shaft 4, the driving arm 21 extends in an axis direction of the base 1, and the driving arm 21 is located in a middle of the base 1; the driving arm 21 can extend downward or upward to achieve connection with the driving base 3; and in a preferred example, the base 1 is provided with a through hole 11 for the driving base 3 to extend through, which facilitates driving of the driving arm 21 to swing up and down through the movable shaft 31 of the driving base 3, such that the front end of the claw arm 2 is further driven to swing.

Cooperation of the elongated driving groove 22 and the movable shaft 31, and a reciprocating stroke of the driving base 3, enable to drive the movable shaft 31 to slide along the driving groove 22, which achieves reciprocating swing of the front end of the claw arm 2, and further achieves conversion of a vertical stroke into a swinging stroke. Despite a simple structure, the present disclosure achieves simultaneous swing of a plurality of arms in a more stable and linear manner.

Two, four or more of the claw arms 2 can be arranged.

Specifically, the middle of the base 1 is provided with the through hole 11, and the through hole 11 is configured for the driving base 3 to extend through, which potentially reduces an overall height of the sexual product, facilitates fitting between the movable shaft 31 of the driving 3, achieves conversion of the vertical stroke into a reciprocating swing stroke, ensures stability and linearity of the swing, and reduces probability of jamming.

In an example of the present disclosure, the claw arm 2 and the driving arm 21 are arranged in a way of bending with the pivoting portion 10 as a base point, a length of the driving arm 21 is less than that of the claw arm 2, and the shorter driving arm 21 can drive the claw arm 2 to swing, such that a larger swing amplitude is available at the front end of the claw arm 2, that is, a small stroke can drive a larger stroke.

Specifically, a shaft hole is formed between the claw arm 2 and the driving arm 21, the pivoting portion 10 is provided with the rotating shaft 4, and the rotating shaft 4 extends into the shaft hole, thereby achieving the swing of the claw arm 2.

In an example of the present disclosure, the driving device is either a driving assembly or a telescopic motor.

Specifically, the driving assembly includes a rotary motor 5, a rotating base 51 connected to the rotary motor 5, a guide base 52 sleeved on an outer wall of the rotating base 51, and a sliding base 53 sleeved on an outer wall of the guide base 52;

- a closed-loop arc-shaped groove 51*a* that is not coplanar is formed on an outer peripheral wall of the rotating base 51, and the guide base 52 is provided with a guide groove 52*a* vertically arranged;
- the sliding base 53 is provided with a roll ball 53*a*, and the roll ball 53*a* penetrates through the guide groove 52*a* and is partially snap-fitted into the arc-shaped groove 51*a;*
- when the rotary motor 5 rotates, the rotating base 51 is driven to rotate and the roll ball 53*a* is forced to slide along the arc-shaped groove 51*a* and the guide groove 52*a*, which further drives the sliding base 53 to move vertically; and an upper end of the sliding base 53 is connected to a bottom of the driving base 3.

Cooperation of the roll ball 53*a*, the arc-shaped groove 51*a* and the guide groove 52*a*, enables more linear reciprocating vertical movement of the driving base 3 and more linear swing of the claw arm 2, reduces the problem of jamming, and improves stability of swing.

The driving base 3 extends upward after penetrating through the base 1 to form a central shaft 60, the central shaft 60 is connected to a telescopic base 6, and

- when the telescopic base 6 moves reciprocatingly in a vertical direction, a plurality of the claw arms 2 swing reciprocatingly.

Through the through hole 11 of the base 1, reciprocating movement of the driving base 3 can achieve the reciprocating swing of the plurality of the claw arms 2 and the reciprocating movement of the telescopic base 6, thereby achieving a dual-drive structure.

Specifically, the base 1 is provided with an upper cover 7, the upper cover 7 is provided with an avoidance groove 70 for the claw arm 2 to extend through,

- a middle of the upper cover 7 is provided with a guiding sleeve 81 that extends upward, a middle of the guiding sleeve 81 is provided with a vertical hole 82, and the central shaft 60 extends into the vertical hole 82 and is connected to the telescopic base 6, such that the telescopic base 6 and the central shaft 60 can slide reciprocatingly along the vertical hole 82, which plays a guiding role.

In an example of the present disclosure, the telescopic base 6 is provided with a positioning portion 9 that extends into the vertical hole 82, an outer wall of the positioning portion 9 fits the vertical hole 82, the positioning portion 9 is connected to the central shaft 60 by a screw rod or in a threaded manner or by glue adhesion, and different connection methods are selected according to different usage scenarios.

Of course, the central shaft 60 can also be directly connected to the telescopic base 6.

Specifically, both the telescopic base 6 and the central shaft 60 are of hollow structures, which facilitates penetration of cables or other structures, and reduces production costs.

The guiding sleeve 81 is made of silica gel, and an upper end or a whole of the guiding sleeve 81 can be of a silica gel structure, which achieves a damping effect.

Specifically, an outer wall of the housing 100 is provided with an elastic layer 101, and an end portion of the claw arm 2 and an upper end of the telescopic base 6 are encapsulated in the elastic layer 101. The elastic layer 101 encapsulates the housing 100, the claw arm 2 and the telescopic base 6, and alternatively, only the claw arm 2 and the telescopic base 6 can be encapsulated therein.

Specifically, when the present disclosure is used as a male adult product, the upper end of the telescopic base 6 is lower than a topmost end of the claw arm 2 (the upper end of the telescopic base 6 is higher than the topmost end of the claw arm 2, but a length of the telescopic base 6 is less than a height of a female adult product), and the plurality of the claw arms 2 enclose a massage area.

The telescopic base 6 and the claw arm 2 can be combined for male prostate treatment, and for example, a top end of the telescopic base 6 can extend into an anus 301 of a patient to massage a prostate reflex zone of the patient, and the claw arm 2 can be used to massage a periphery of the anus 301.

When the present disclosure is used as the male adult product, the length of the telescopic base 6 is less than that of the topmost end of the claw arm 2 that swings, and when the driving device is activated, the upper end of the telescopic base 6 can stimulate a glans 302 of a male reproductive organ, and the claw arm 2 can stimulate an outer peripheral wall of the glans 302, thereby achieving dual stimulation through a single driving device.

When the present disclosure is used as the male adult product, the telescopic base 6 can extend integrally from the driving base 3, and when the present disclosure is used as the female adult product, a stroke length and telescoping frequency are designed for the telescopic base 6, while a structure of the guiding sleeve 81 is designed to enhance user experience.

Specifically, after penetrating through the through hole 11, the upper end of the telescopic base 6 is in direct or indirect contact with the elastic layer 101, and in a direct contact state, the elastic layer 101 at this position can have a relatively large thickness.

In an indirect contact state, a negative pressure chamber or airbag can be arranged to stimulate a male reproductive organ.

When the upper end of the telescopic base 6 is in indirect contact with the elastic layer 101, the upper end of the elastic layer 101 can be an airbag or air chamber.

The design highlight lies in differences in sensory stimulation, e.g., in direct connection with the elastic layer 101, the stimulation is rigid, and when the airbag or air chamber is used for connection, the stimulation is flexible.

Specifically, when the present disclosure is used as the female adult product, the upper end of the telescopic base 6 extends upward, and the upper end of the telescopic base 6 is higher than an upper end of the claw arm 2, where the hollow structure facilitates wiring of a vibration motor 200.

Specifically, the vibration motor 200 is arranged in the hollow structure of the telescopic base 6, which achieves tertiary stimulation.

Specifically, the guiding sleeve 81 is made of silica gel.

Specifically, the inwardly concave avoidance groove is formed between the upper cover 7 and the telescopic base 6, which facilitates entry of the claw arm 2 into a vagina 301 when fitting the housing 100.

Specifically, the upper end of the telescopic base 6 is elliptical, and an outer diameter of the telescopic base 6 is smaller than that of the base.

Specifically, the number of the claw arms 2 can be one, two, three, four, or five, and a plurality of the claw arms can be arranged according to actual needs and spatial arrangements.

In the actual design, the driving device is provided with a displacement sensor or servo control device, and through the displacement sensor, the claw arm 2 can be fitted with the outer wall of the housing 100 before use, which facilitates insertion of the claw arm into the vagina 301 and achieves internal stimulation.

Figure 13:
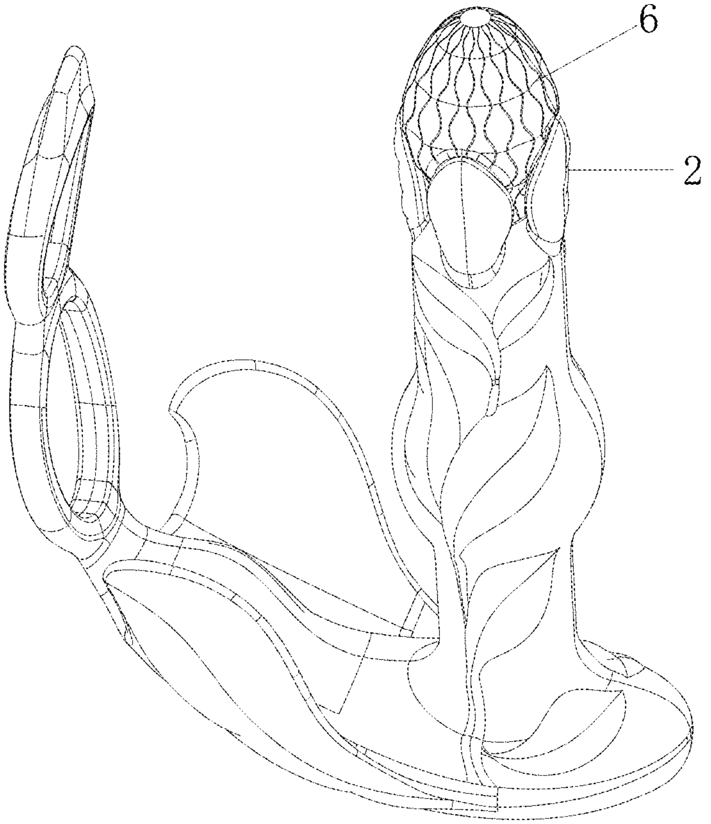
FIG. 13 is a schematic diagram of the present disclosure used as a male prostate treatment product with a claw arm folded.
Figure 14:
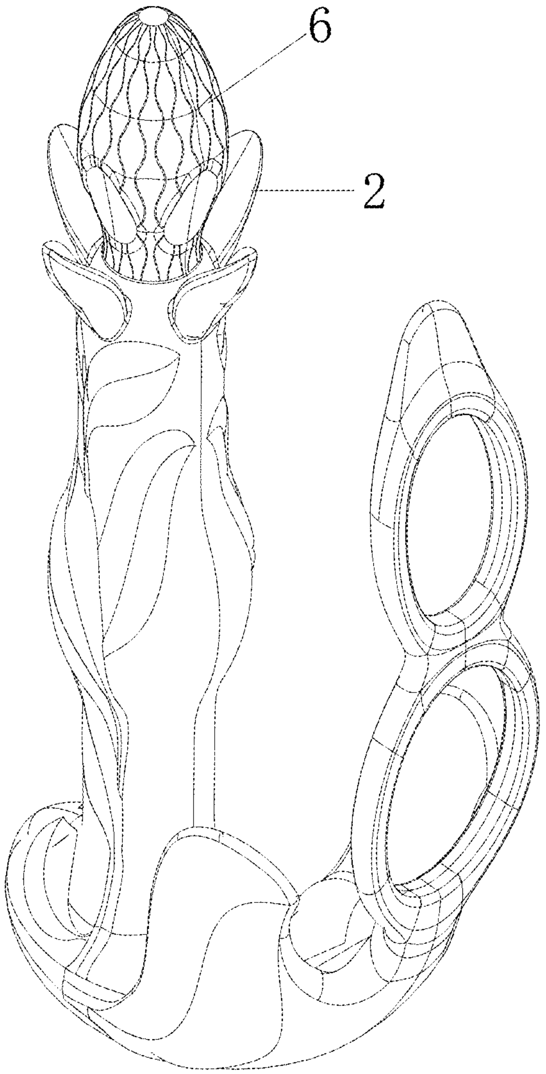
FIG. 14 is a schematic diagram of the present disclosure used as a male prostate treatment product with a claw arm unfolded.

FIGS. 13 and 14 illustrate states of a claw arm 2 of a male prostate treatment device according to the present disclosure, where the telescopic base 6 is configured to extend into an anus 301 and massage the outer periphery of the anus 301, and an outer wall of the structure is coated with the elastic layer 101; and the elastic layer 101 of the structure further includes structures such as a cock ring for convenient wearing.

Of course, when a height of the telescopic base 6 is less than that of the claw arm 2, stimulation of the glans 302 can also be achieved.

The elastic layer 101 can be made of silica gel or a material selected based on actual needs.

Figure 15:
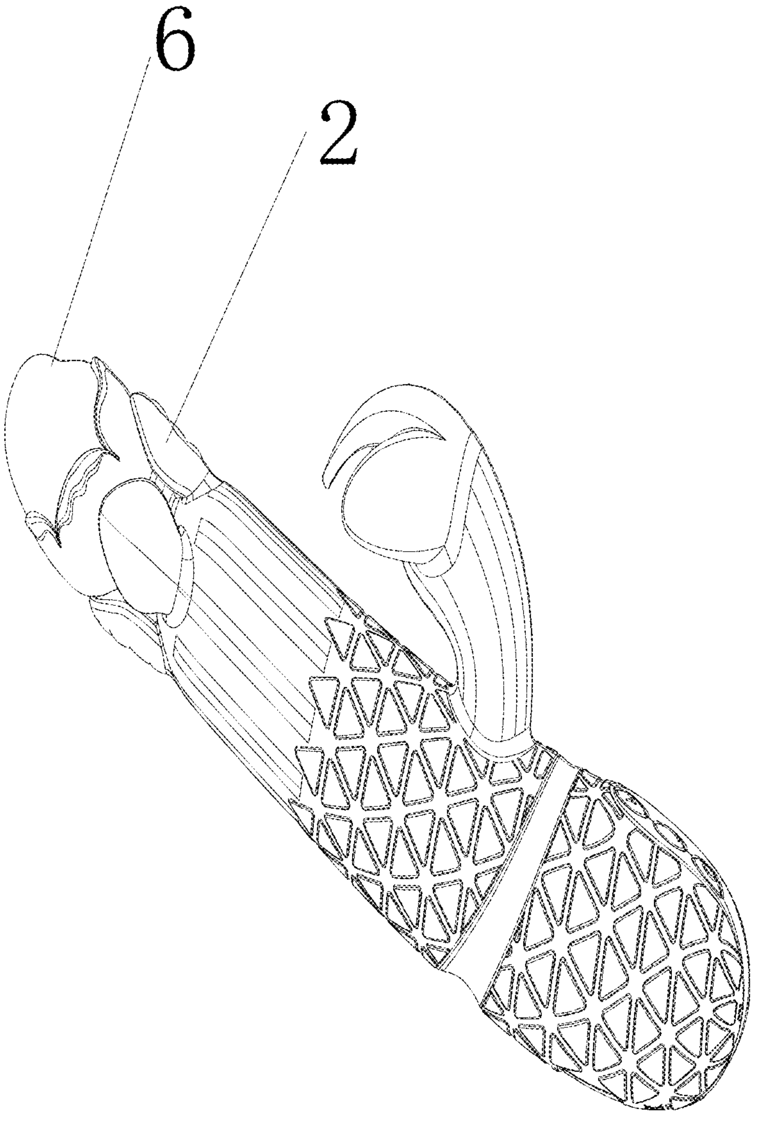
FIG. 15 is a schematic diagram of the present disclosure used as a female adult product with a claw arm folded.
Figure 16:
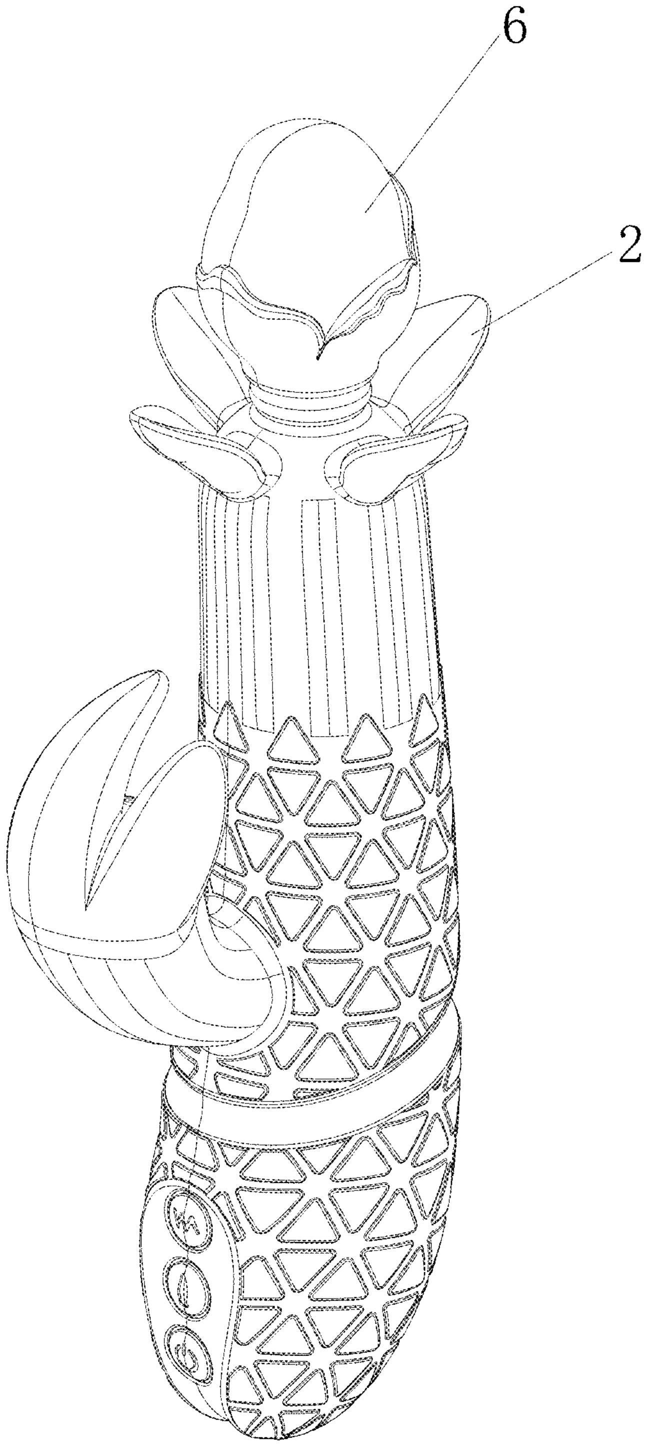
FIG. 16 is a schematic diagram of the present disclosure used as a female adult product with a claw arm unfolded.
Figure 17:
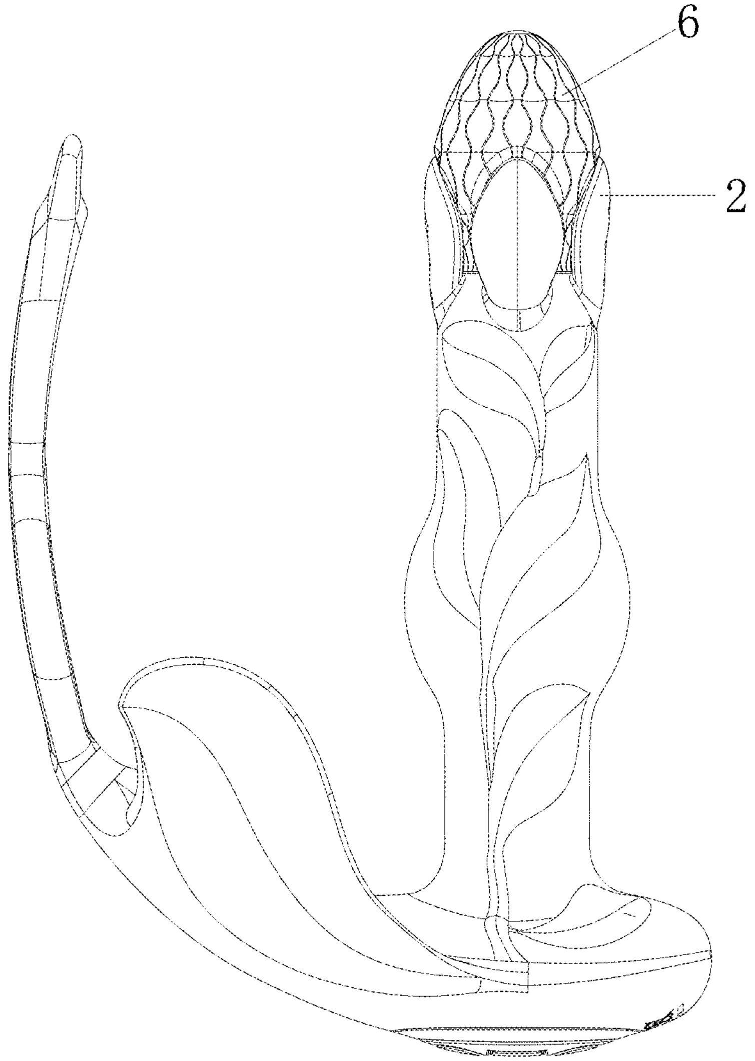
FIG. 17 is a side view of the present disclosure used as a male prostate treatment product with a claw arm folded.
Figure 18:
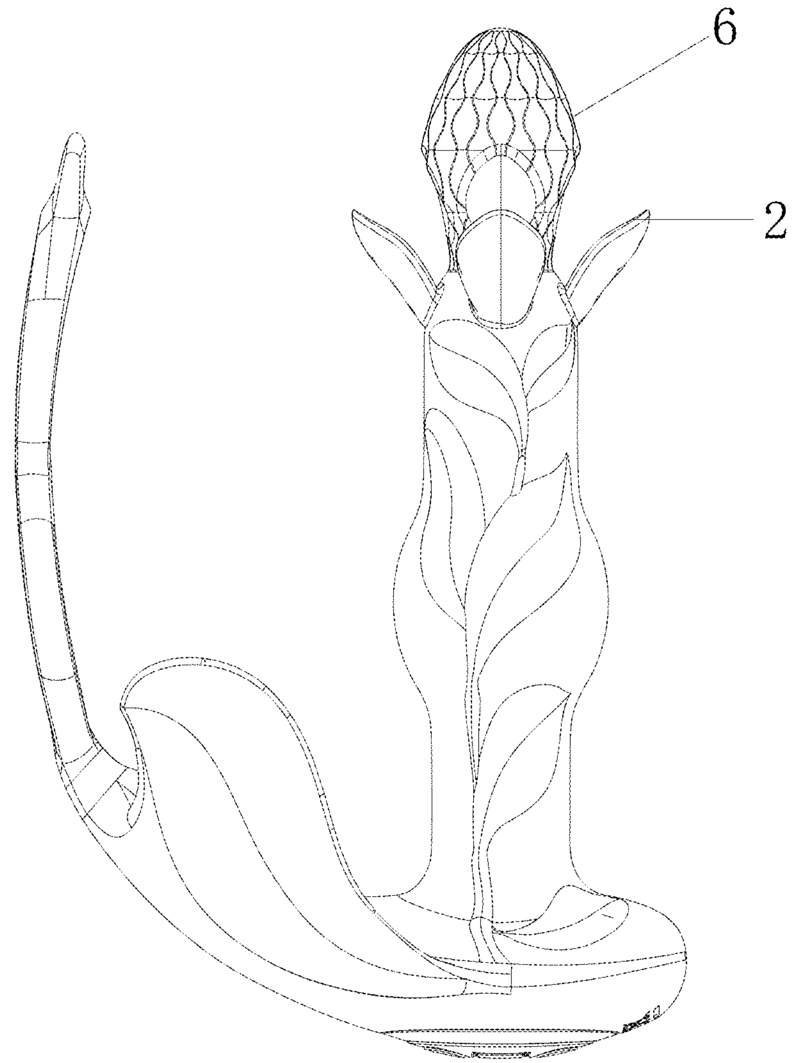
FIG. 18 is a side view of the present disclosure used as a male prostate treatment product with a claw arm unfolded.
Figure 19:
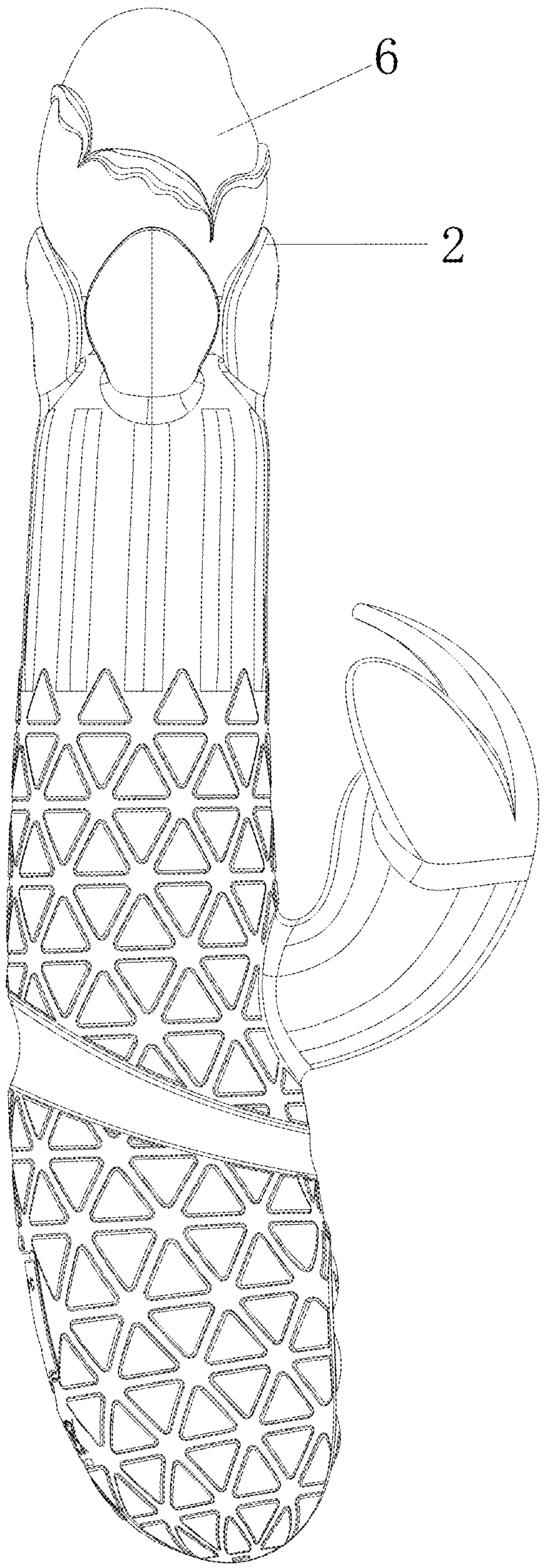
FIG. 19 is a side view of the present disclosure used as a female adult product with a claw arm folded.
Figure 20:
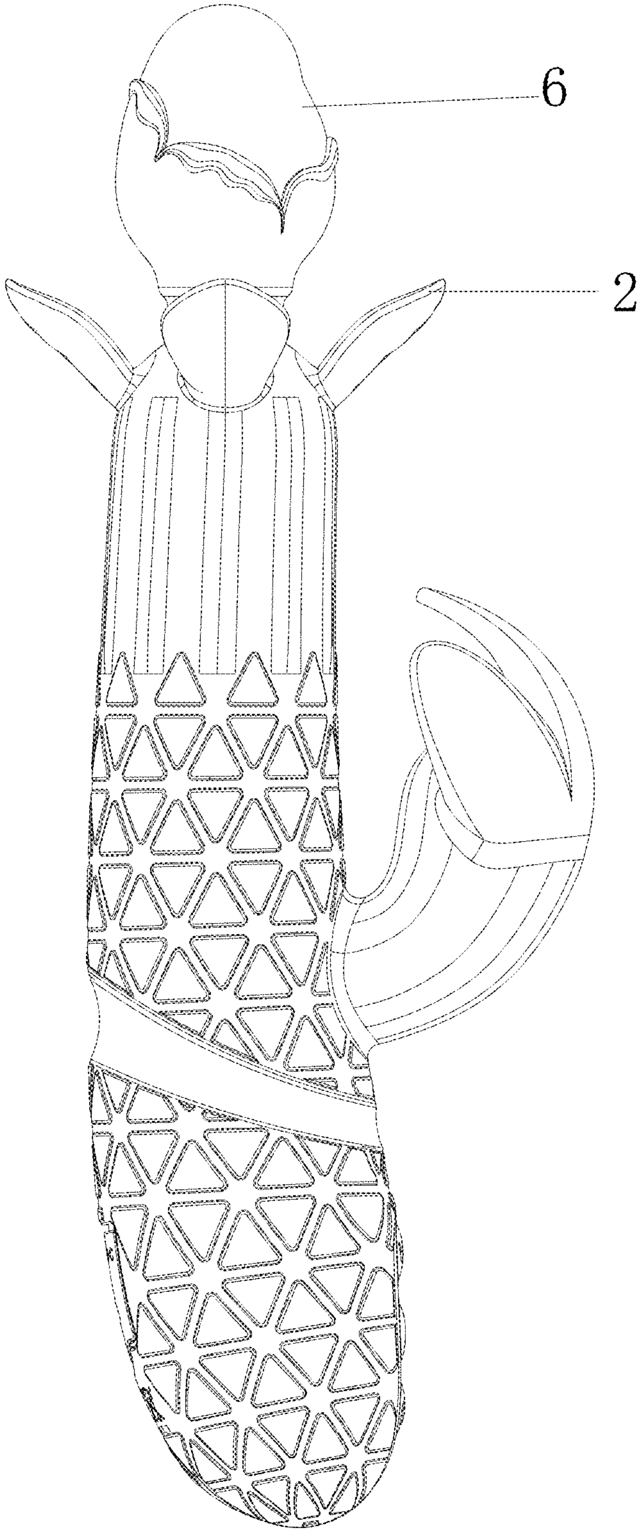
FIG. 20 is a side view of the present disclosure used as a female adult product with a claw arm unfolded.

FIGS. 15 and 16 illustrate states of a claw arm 2 of a female adult product according to the present disclosure, where the housing 100 can be further provided with an external vibration structure to enhance stimulation to a female user.

An outer wall of the elastic layer 101 can also be provided with textures of leaves, flowers and the like, to enhance aesthetic appeal and market competitiveness of the present product.

The above description is merely a preferred example of the present disclosure and is not intended to limit the patent scope of the present disclosure. Any equivalent structural transformations made by using the description of the present disclosure and the contents of the accompanying drawings on the premise of not deviating from the inventive concept of the present disclosure, or directly or indirectly used in other related technical fields, are all similarly included in the scope of patent protection of the present disclosure.

What is claimed is:

1. A dual-drive universal sexual product with multi-point stimulation, comprising:

a base, wherein the base is fixed to a housing, the base is provided with at least one claw arm distributed along an axis of the base, the base is provided with a pivoting portion, the at least one claw arm is swingingly mounted on the pivoting portion, each claw arm is provided with a driving arm in a way of extending from the pivoting portion in an axis direction, and the driving arm is provided with an elongated driving groove;

a driving base, wherein the driving base is arranged on a lower wall of the base and can slide in a height direction, and the driving base and each driving arm are connected directly or through a transmission member;

a telescopic base, wherein the driving base extends upward after penetrating through the base to form the telescopic base; and a driving device, wherein the driving base is fixedly arranged in the housing, the driving device is arranged on a lower wall of the driving base and is configured to drive the driving base to move reciprocatingly in a vertical direction, and when the driving base moves, a front end of the at least one claw arm is driven to swing reciprocatingly around the pivoting portion as a fulcrum, and the telescopic base slides in the height direction;

wherein the transmission member includes a movable shaft and a cooperating groove;

wherein the driving assembly includes a rotary motor, a rotating base, a guide base, a groove, a guide groove, a sliding base, and roll ball.

2. The dual-drive universal sexual product with multi-point stimulation according to claim 1, wherein a middle of the base is provided with a through hole, and the through hole is configured for the driving base to extend through.

3. The dual-drive universal sexual product with multi-point stimulation according to claim 2, wherein an outer wall of the housing is provided with an elastic layer, and an end portion of the at least one claw arm and an upper end of the telescopic base are encapsulated in the elastic layer.

4. The dual-drive universal sexual product with multi-point stimulation according to claim 1, wherein the driving base is provided with a movable shaft that is distributed like the at least one claw arm, and the movable shaft extends into the driving groove and can slide in a length direction thereof; and each claw arm and the driving arm are arranged in a way of bending with the pivoting portion as a base point, and a length of each driving arm is less than that of each claw arm.

5. The dual-drive universal sexual product with multi-point stimulation according to claim 1, wherein a shaft hole is formed between the at least one claw arm and the driving arm, the pivoting portion is provided with a rotating shaft, and the rotating shaft extends into the shaft hole.

6. The dual-drive universal sexual product with multi-point stimulation according to claim 1, wherein the driving device is either a driving assembly or a telescopic motor.

7. The dual-drive universal sexual product with multi-point stimulation according to claim 6, wherein the driving assembly comprises a rotary motor, a rotating base connected to the rotary motor, a guide base sleeved on an outer wall of the rotating base, and a sliding base sleeved on an outer wall of the guide base;

a closed-loop arc-shaped groove that is not coplanar is formed on an outer peripheral wall of the rotating base, and the guide base is provided with a guide groove vertically arranged;

the sliding base is provided with a roll ball, and the roll ball penetrates through the guide groove and is partially snap-fitted into the arc-shaped groove;

when the rotary motor rotates, the rotating base is driven to rotate and the roll ball is forced to slide along the arc-shaped groove and the guide groove, which further drives the sliding base to move vertically; and an upper end of the sliding base is connected to a bottom of the driving base.

8. The dual-drive universal sexual product with multi-point stimulation according to claim 6, wherein the driving base is slidably mounted on the base;

the driving base extends upward after penetrating through the base to form a central shaft, the central shaft is connected to a telescopic base, and wherein the at least one claw arm includes a plurality of claw arms, when the telescopic base moves reciprocatingly in a vertical direction, the plurality of claw arms swing reciprocatingly.

9. The dual-drive universal sexual product with multi-point stimulation according to claim 8, wherein the base is provided with an upper cover, the upper cover is provided with an avoidance groove for the plurality of claw arms to extend through, a middle of the upper cover is provided with a guiding sleeve that extends upward, a middle of the guiding sleeve is provided with a vertical hole, and the central shaft extends into the vertical hole and is connected to the telescopic base.

10. The dual-drive universal sexual product with multi-point stimulation according to claim 9, wherein both the telescopic base and the central shaft are hollow structures.

11. The dual-drive universal sexual product with multi-point stimulation according to claim 10, wherein when the present disclosure is used as a female adult product, the upper end of the telescopic base extends upward, and the upper end of the telescopic base is higher than an upper end of the at least one claw arm.

12. The dual-drive universal sexual product with multi-point stimulation according to claim 11, wherein a vibration motor is arranged in a hollow structure of the telescopic base.

13. The dual-drive universal sexual product with multi-point stimulation according to claim 11, wherein the guiding sleeve is made of silica gel.

14. The dual-drive universal sexual product with multi-point stimulation according to claim 11, wherein an inwardly concave avoidance groove is formed between the upper cover and the telescopic base.

15. The dual-drive universal sexual product with multi-point stimulation according to claim 11, wherein the upper end of the telescopic base is elliptical, and an outer diameter of the telescopic base is smaller than that of the base.

16. The dual-drive universal sexual product with multi-point stimulation according to claim 8, wherein the telescopic base is provided with a positioning portion that extends into the vertical hole, an outer wall of the positioning portion fits the vertical hole, and the positioning portion is connected to the central shaft by a screw rod or in a threaded manner or by glue adhesion.

17. The dual-drive universal sexual product with multi-point stimulation according to claim 8, wherein when the present disclosure is used as a male adult product, the plurality of claw arms enclose a massage area.

18. The dual-drive universal sexual product with multi-point stimulation according to claim 17, wherein after penetrating through the through hole, the upper end of the telescopic base is in direct or indirect contact with the elastic layer.

19. The dual-drive universal sexual product with multi-point stimulation according to claim 18, wherein when the upper end of the telescopic base is in indirect contact with the elastic layer, the upper end of the elastic layer can be an airbag or air chamber.

20. The dual-drive universal sexual product with multi-point stimulation according to claim 1, wherein the number of the at least one claw arm can be one, two, three, four, or five.

* * * * *